(12) United States Patent
Manassen et al.

(10) Patent No.: US 6,331,911 B1
(45) Date of Patent: Dec. 18, 2001

(54) LARGE APERTURE OPTICAL IMAGE SHUTTER

(75) Inventors: Amnon Manassen; Giora Yahav; Gavriel J. Iddan, all of Haifa (IL)

(73) Assignee: 3DV Systems Ltd., Yokneam (IL)

(*) Notice: Subject to any disclaimer, the term of this patent is extended or adjusted under 35 U.S.C. 154(b) by 0 days.

(21) Appl. No.: 09/601,805
(22) PCT Filed: Feb. 8, 1998
(86) PCT No.: PCT/IL98/00060
  § 371 Date: Aug. 4, 2000
  § 102(e) Date: Aug. 4, 2000
(87) PCT Pub. No.: WO99/40478
  PCT Pub. Date: Aug. 12, 1999

(51) Int. Cl.[7] .............. G02F 1/03; H01L 29/06
(52) U.S. Cl. ............ 359/260; 359/248; 359/276; 257/14; 257/184; 257/189; 257/661
(58) Field of Search .................. 359/245, 246, 359/247, 248, 260, 276; 257/14, 184, 187, 189, 656, 661, 663

(56) References Cited

U.S. PATENT DOCUMENTS

| | | | |
|---|---|---|---|
| 4,525,687 | 6/1985 | Chemla et al. | 359/276 |
| 5,307,200 | * 4/1994 | Yoshida | 359/248 |
| 5,412,499 | * 5/1995 | Chiu et al. | 359/248 |
| 5,455,451 | * 10/1995 | Usagawa et al. | 257/661 |

FOREIGN PATENT DOCUMENTS

WO 97/01111 A2  1/1997  (WO).
WO 97/01111 A3  1/1997  (WO).

OTHER PUBLICATIONS

Fujitsu General Ltd.; Patent Abstracts of Japan; vol. 015; No. 349 (P–1247); Sep. 4, 1991 & JP 03–132717 A; Jun. 1991.

Seiko Epson Corp.; Patent Abstracts of Japan; vol. 012; No. 093 (P–680); Mar. 26, 1988 & JP 62–226130 A; Oct. 5, 1987.

Wood, T. et al.; "High Speed Optical Modulation with GaAs/GaAIAs Quantum Wells in a p–i–n Diode Structure"; Appli Phyical Letter; 44(1); pp. 16–18; Jan. 1, 1984.

Miller, D. et al.; "Band–Edge Electroabsorption in Quantum Well Structures: The Quantum–Confined Stark Effect"; Physical Review Letter; vol. 56; No. 22; pp. 2173–2176; Nov. 26, 1984.

Miller, D. et al.; "Electric Field Dependence of Optical Absorption Near Band Gap of Quantum–Well Structures"; Physical Review B; vol. 32; No. 2; pp. 1043–1060; Jul. 15, 1985.

* cited by examiner

Primary Examiner—Loha Ben
(74) Attorney, Agent, or Firm—Fenster & Company Patent Attorneys Ltd.

(57) ABSTRACT

An optical image shutter is provided having a multiplicity of thin layers of alternating narrow and wide gap semiconductor material stacked to form an MQW structure and electrodes located on at least two semiconductor surfaces of the image shutter, wherein the electrodes are configured so that a voltage difference applied between them produces an electric field that is temporally and spatially substantially uniform in the volume of the MQW structure and wherein the aperture of the image shutter is greater than 4 square mm.

34 Claims, 5 Drawing Sheets

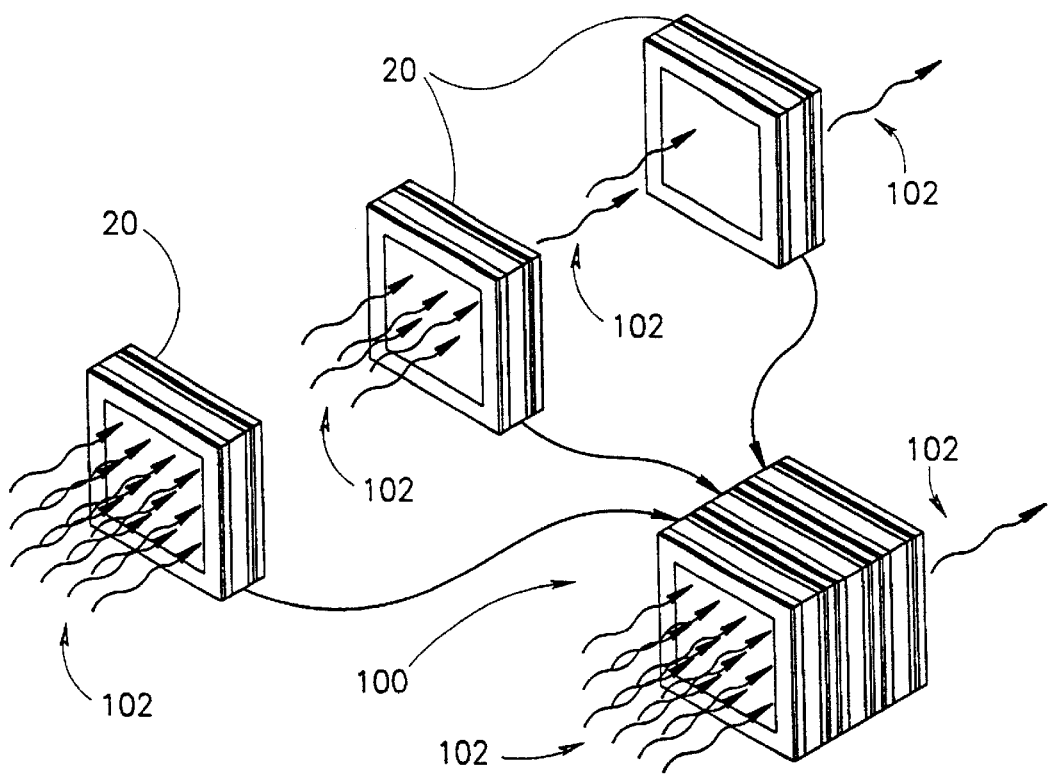
FIG.2
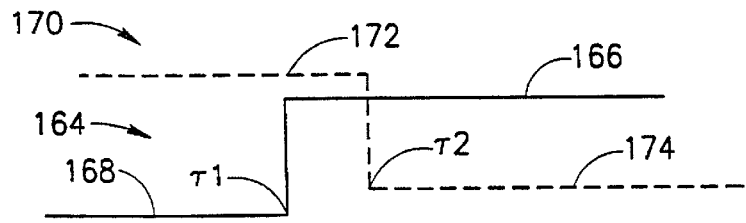
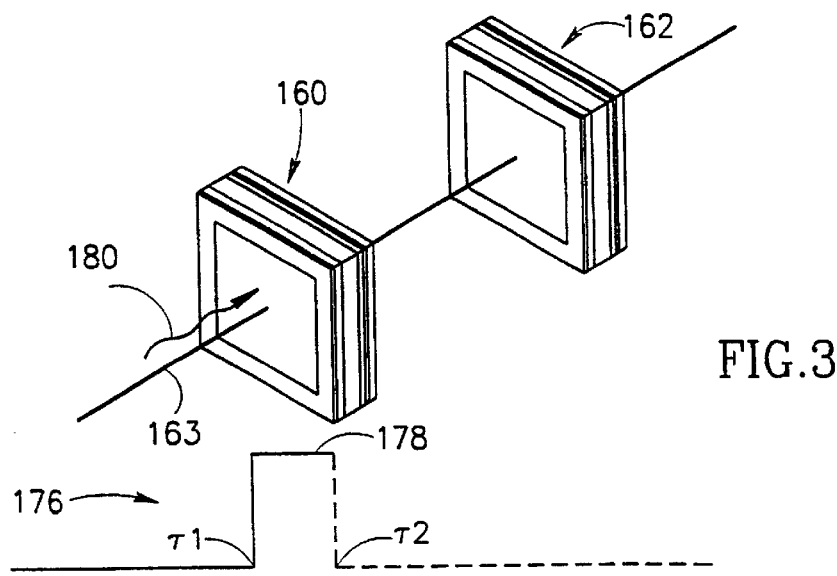
FIG.3

LARGE APERTURE OPTICAL IMAGE SHUTTER

RELATED APPLICATIONS

The present application is a US national application of PCT/IL98/00060, filed Feb. 8, 1998.

FIELD OF THE INVENTION

The invention relates to optical shutters and modulators, in particular to large aperture solid state image shutters that can operate at high frequency.

BACKGROUND OF THE INVENTION

Many optical image applications require very fast large aperture image shutters. Mechanical shutters, though available with almost any size aperture, are generally too slow for these applications. Gated image intensifiers are fast enough, having rise times on the order of nanoseconds but they require generally undesirably large driving voltages that are in the range of 160 to 1000 volts. Liquid crystal shutters operate at low voltages and though they are significantly faster than mechanical shutters they are still much slower than gated image intensifiers.

Low voltage high speed optical modulators or shutters that operate at frequencies on the order of $10^9$ Hertz have been described in: "High Speed Optical Modulation with GaAs/GaAlAs Quantum Wells in a P-I-N Diode Structure", T. H. Woods et al, Appl. Phys. Lett. 44(1), p16 (1984); "Band-Edge Electro- /absorption in Quantum Well Structures: The Quantum—Confined Stark Effect", D. A. B. Miller et al, Phys. Rev. Lettr. 26, p2173 (1984); "Electric Field Dependence of Optical Absorption Near Band Gap of Quantum Well Structures", D. A. B. Miller et al, Phys. Rev. B, vol 32 #2, p1043, (1985); and U.S. Pat. No. 4,525,687 to Chemla et al., all of which are incorporated herein by reference. These modulators are based on the fact that the absorptive part (the imaginary part) of the index of refraction of light in a semiconductor can be made dependent upon an electric field applied to the material of the semiconductor. The shutters are made from very thin layers of semiconductor material that are sandwiched together to form a series of quantum wells. The quantum well structure of the shutters amplifies the effect of the electric field on the absorptive part of the index of refraction of the material and thereby provides relatively large changes in absorption of light for relatively small operating voltages. While these semiconductor shutters are very fast and operate at low voltages they achieve their speed because their active volumes and apertures are very small.

They are used primarily for optical communications applications where their small apertures are acceptable.

The technology of semiconductor optical shutters is based on the way photons interact with semiconductor materials. As a beam of light travels through a semiconductor, the photons in the beam interact with the material of the semiconductor and are absorbed from the beam causing the light beam to be attenuated. If the rate of attenuation of photons in the semiconductor is graphed as a function of the energy of the photons, the attenuation rate generally shows a very steep rise, called the absorption edge of the semiconductor, at a well-defined photon energy or wavelength. The energy, hereafter the "absorption edge energy", at which the absorption edge occurs is generally very close to the band gap of the semiconductor. Photons having energy below the absorption edge energy (and therefore a wavelength above the wavelength corresponding to the absorption edge energy, hereafter the "absorption edge wavelength"), interact very weakly (if at all) with the semiconductor material and are only very slightly attenuated by the semiconductor material. Photons with energy above the absorption edge energy (i.e. wavelength below the absorption edge wavelength) interact strongly with the material and are rapidly attenuated per unit path length in the material.

Typically, the absorption length for photons of energy just below the absorption edge energy is on the order of 10 cm$^{-1}$ and for photons of energy just above the absorption edge energy, ~10$^4$ cm$^{-1}$. Generally, the absorption edge energy can be shifted to lower energies by applying an electric field to the semiconductor and then can be shifted back to higher energies by removal or reduction of the applied electric field. As a result, for photons of energy sufficiently close to the absorption edge energy the absorption edge energy can be shifted to just below or just above the energy of the photons by an electric field applied to the semiconductor. This causes the photons to be either very strongly or very weakly absorbed by the semiconductor. In this way, the amount of light transmitted by the semiconductor material at a wavelength, hereafter an operational wavelength, close to the absorption edge wavelength of the semiconductor can be controlled by an electric field in the semiconductor. The semiconductor acts like an electrically operated optical shutter for light having a wavelength equal to an operational wavelength of the semiconductor material.

The absorption edge of a semiconductor occurs at an energy slightly less than the band gap energy of the semiconductor. Instead of lifting an electron from the valence band into the conduction band, a photon can excite an electron almost to the conduction band and leave it loosely bound to the hole from which it was lifted in a short lived Hydrogen like resonance. The bound resonance of electron and hole is called an exciton. The binding energy of the exciton is typically low, on the order of a few mev. At room temperature an exciton quickly picks up energy from phonons and ionizes into an uncoupled electron and hole, with the electron entering the conduction band. If the energy at which the absorption edge occurs is "Ex", and the band gap energy and exciton binding energies are "Eg" and "Eb" respectively then Ex=Eg–Eb.

When an electric field is applied to a bulk semiconductor, both Eg and Eb are broadened and reduced. The electric field broadens and reduces Eg by coupling energy to valence electrons over distances on the order of the cell length of the semiconductor (typically 0.5 nm), in what is known as the Franz-Keldysh effect. The electric field broadens and reduces exciton binding energies, Eb, by coupling energy to excitons over distances on the order of the size of their diameters, which is typically about 30 nm. The effect of an electric field on an exciton is a Stark effect, whereby the electric field slightly polarizes the exciton and increases the average separation of the hole and electron in the exciton, thereby reducing the binding energy of the exciton.

Neither the Franz-Keldysh effect nor the Stark effect is effective for shifting the absorption edge energy Ex, in a bulk semiconductor. The Franz-Keldysh effect is too small. The Stark effect, while significantly larger, rapidly ionizes the exciton which causes the energy of the absorption edge to be insensitive to an applied electric field.

The effect of electric fields on absorption edge energy increases significantly when the semiconductor is formed from thin layers of narrow band gap semiconductor material alternating with layers of wide gap semiconductor material, where the thickness of the narrow gap layers is significantly less than the diameter of excitons. In such a layered structure, the narrow gap layers act as quantum wells having physical widths equal to the thickness of the narrow gap layers. Electrons and holes formed in the semiconductor material of the wells are trapped in these quantum wells at discrete energy levels. If the wide gap layers are sufficiently thick, the wave functions of electrons and holes in a quantum well are strictly confined within the quantum wells and do not tunnel through to adjacent quantum wells. The structure then behaves like a series of uncoupled quantum wells conventionally called multiple quantum wells or MQW's.

As a result of the confinement of electrons and holes in the quantum wells, the distance between the electron and hole in an exciton is restricted in a direction perpendicular to the planes of the layers to a distance less than the width of the quantum wells i.e. to the thickness of the narrow gap layers. This causes the average distance between an electron and hole in an exciton trapped in a quantum well to be smaller than the average distance between an electron and hole in an exciton in a bulk semiconductor formed from the same semiconductor material from which the quantum wells are formed. Excitons in an MQW made of a given semiconductor material therefore have a higher binding energy and are more stable than excitons in a bulk semiconductor made from the same given material. Furthermore, an electric field applied perpendicular to the MQW layers will not polarize and distort excitons to such an extent (it cannot separate an electron and hole in an exciton by more than the width of the quantum well) that the excitons rapidly ionize. As a result, in a semiconductor MQW structure, unlike in a bulk semiconductor, an electric field can be used to effectively control the absorption edge energy, provided the electric field is perpendicular to the planes of the quantum wells. An MQW structure can therefore be used as an optical shutter.

If the discrete energies of the first confined states of electrons and holes in the quantum wells are respectively "Ee" and "Eh", then the absorption edge energy for the MQW's, is $Ex=Eg+Ee+Eh-Eb$. An electric field applied to the MQW structure that significantly affects any of the energies Eg, Eh or Eb can be used to shift Ex and effectively control the absorption edge energy and wavelength. For an MQW in which the narrow gap layers are formed from GaAs and the wide gap layers are formed from $Ga_{(1-x)}Al_xAs$ with x ~0.36, and the thickness of the layers is approximately 10 nm, Ee, Eh, and Eb are on the order of 50 mev, 5 mev, and 10 mev respectively and Ex is ~1.45 ev. An electric field of $1-5\times10^4$ V/cm applied perpendicular to the layers of this MQW structure couples energy in the range from 10–50 mev to the electron and hole wave functions ($[1-5\times10^4$ V/cm$\times 10^{-6}$ cm] x the charge of the electron) and can therefore be used to control the energy of the absorption edge.

US Pat. No. 4,525,687 describes an MQW optical shutter comprising 50 GaAs quantum wells each 9.5 nm thick. The wells are formed in the intrinsic part of a pin diode. The diode is operated back biased so that substantially all of the potential difference applied to the diode appears across the quantum wells. Light passes through the diode perpendicular to the planes of the quantum wells. At a wavelength of 857 nm (1.446 ev) the shutter transmits about 75% of the light when open (no voltage applied to the diode) and about 35–40% when the shutter is closed by applying a potential of 8V to the diode. The shutter therefore has an on/off transmission ratio of about 2. The useful optical aperture of the shutter described was confined to an area of about 100 microns in diameter and the active volume of the shutter to about 100 cubic microns. The shutter operates with a rise time on the order of 2 nanoseconds.

Prior art optical shutters based on MQW technology have been very small aperture, small volume devices used mainly in optical communications applications. While the shutters operate at relatively high frequencies, their apertures are too small for many applications. In particular they are much too small for shuttering full images. For example, PCT Patent Publication WO97/01111 entitled "Improved Optical Ranging Camera" published Jan. 9, 1997 whose disclosure is incorporated herein by reference, describes range finding cameras that acquire depth or distance information simultaneously over entire extended images. Such cameras require high speed, large aperture shutters that have high on/off transmission ratios. It would be desirable to have large aperture shutters for shuttering or modulating images that operate at the frequencies of the small volume MQW shutters used in optical communications and that have high on/off transmission ratios.

SUMMARY OF THE INVENTION

It is an object of the present invention to provide a large aperture, fast rise time optical image shutter with a high on/off transmission ratio.

An optical image shutter, in accordance with a preferred embodiment of the present invention, uses MQW technology to provide a large aperture fast rise time shutter suitable for optical shuttering and modulation of complete images. The image shutter preferably comprises a plurality of thin alternating layers of narrow and wide gap semiconductor material grown between an n-doped and a p-doped layer to form a pin diode structure with multiple quantum wells in the intrinsic part of the diode. The cross section of the pin diode structure parallel to the planes of the quantum wells is relatively large compared to prior art devices. The shutter has two relatively large planar end surfaces at either end of the diode structure, which are parallel to the planes of the quantum wells. Surface regions of the end surfaces serve as apertures for light to enter and exit the image shutter. Light entering the shutter through an aperture travels through the image shutter in a direction substantially perpendicular to the planes of the quantum wells. The pin diode structure of the shutter is back biased to produce an electric field perpendicular to the planes of the quantum wells in the material of the quantum wells. Varying the bias voltage, and thereby the electric field in the quantum wells, controls the amount by which light entering the shutter is attenuated as it passes through the shutter. The image shutter preferably has an aperture of area at least 4 mm². More preferably, the area of the aperture is greater than 9 mm². Most preferably, the area of the aperture is greater than 16 mm².

A problem associated with providing a fast MQW shutter having a large size aperture is to assure that when a voltage change is applied to operate the shutter, the resultant change in electric field is concentrated in the active volume of the shutter, that it is substantially uniform throughout the active volume of the shutter and that it establishes itself in a time period shorter than the desired rise time of the shutter. The time it takes for a change in the electric field resulting from a change in applied voltage to substantially reach equilibrium over all the active volume of the shutter, may conveniently be estimated by the RC time constant of the shutter. A 3 mm diameter optical shutter constructed according to prior art MQW shutters would have an estimated RC time constant of about 50 nanoseconds. This time constant is much too long for many imaging applications.

One of the causes of long rise times in large high speed image shutters is the extended time it takes for a signal or voltage change applied to points along edges of the shutter's aperture to propagate to the center region of the shutter. In a preferred embodiment of the present invention the RC time constant of the image shutter is kept low by reducing time differences between times that a voltage change applied to the shutter is felt at different points in the active volume of the shutter. In an especially preferred embodiment of the present invention this is achieved by providing a thick very highly doped contact layer at each end of the pin diode structure of the shutter and/or depositing on the contact layer specially configured pure metal driving electrodes for generating electric fields in the quantum wells of the shutter. Preferably, the level of impurities in each of the highly doped contact layers is on the order of or greater than $10^{19}$ impurities/cm$^3$.

High doping results in the width of the depletion layer at the interface between the driving electrodes and a contact layer being very small. As a result, electrical contact between the driving electrodes and the contact layers and thereby between the driving electrodes and the quantum wells, is ohmic and has low resistance. This contributes to reducing the RC time constant of the shutter and also assures that very little of a voltage difference applied between driving electrodes at different ends of the pin diode structure is "lost" in the interfaces between the driving electrodes and the contact layers. The high doping of contact layers at the p end of the pin diode structure of the shutter is preferably achieved with a Beryllium doping technique that provides p-type doping in concentrations up to ~$10^{19}$ impurity/cm$^3$. The n end of the pin structure preferably comprises a GaAs layer heavily doped with silicon.

The specially configured driving electrodes are designed to reduce shutter rise time by providing voltage to as much as possible of the capacitance of the shutter in parallel. In one preferred embodiment of the present invention the driving electrodes are conducting metal frames surrounding the entrance and exit apertures of the shutter. In another preferred embodiment of the invention the driving electrodes are mesh electrodes comprising a metal mesh of preferably transparent conductors connecting the sides of a conducting frame. Preferably, the entrance and exit apertures of the shutter are each covered by the mesh of a mesh electrode and surrounded by the frame of the mesh electrode. The width of the conductors in the mesh and the spacing between conductors are chosen so that there is very little insertion or exit loss and to prevent unwanted diffraction of the light shuttered or modulated by the image shutter. Voltage is applied to a driving electrode by an appropriate power source preferably connected to the driving electrode by a plurality of equal length leads contacting different points around the perimeter of the frame of the driving electrode.

In yet another preferred embodiment of the present invention the entrance and exit apertures are each covered by a plurality of independently driven electrodes. Each individual electrode comprises a conductor with leads that extend to points at edges of the aperture where the individual electrodes are connected to a power source. Preferably the independently driven electrodes are relatively long thin linear conductors. Preferably, the conductors are transparent. Alternatively, and preferably said electrodes are small conducting loops. The electrodes are preferably driven sequentially with electrodes closer to the center of the aperture electrified earlier than electrodes farther from the center of the aperture so that at any time the electric field in the quantum wells is substantially spatially uniform.

According to one aspect of the present invention the entrance and exit apertures are coated with anti-reflecting coatings. Preferably, the anti reflecting coatings reduce insertion and exit losses to less than 5%. More preferably the insertion and exit losses are reduced to less than 1%. Most preferably insertion and exit losses are reduced to less than 0.5%.

According to another aspect of the present invention, a plurality of image shutters are placed one after the other to form a compound image shutter in which a light beam to be modulated passes through each of the plurality of image shutters. The on/off transmission ratio of the compound shutter is greatly increased over the on/off transmission ratio of a single shutter. Preferably, the shutters are driven in parallel so that increases in the on/off transmission ratio are achieved with the voltage used to operate a single shutter.

According to another aspect of the present invention a first and second image shutter aligned collinear along a common axis perpendicular to the planes of their apertures are used to provide very short, fast rise time, light pulses. Assume the first image shutter is closed and the second image shutter is open. Assume that a light beam having a wavelength equal to an operational wavelength of the two shutters travels along the common axis of the first and second shutter and is incident on the first shutter first. Assume that the first shutter is closed. As a result, no light from the beam is transmitted through the two shutters. At time t1 the first shutter opens and at time t2, (t2>t1) the second shutter closes. Light from the beam will be transmitted through the shutters for times between t1 and t2, thereby creating a pulse of light (t2−t1)s long.

According to still another aspect of the present invention an optical device, hereafter referred to as a "multi-wavelength shutter", is provided for shuttering light having wavelengths in at least two different wavelength bands. The multi-wavelength shutter comprises at least one image shutter for each wavelength band of the at least two wavelength bands. The at least one image shutter for each wavelength band has a reflecting coating on a back aperture that reflects wavelengths in the wavelength band. and a reflecting coating on a front aperture that transmits wavelengths in the wavelength band and reflects wavelengths in the other of the at least two wavelength bands. Light in the wavelength band that is incident on the front aperture of the at least one image shutter, if the at least one image shutter is open, is reflected from the reflecting coating on the back aperture of the at least one image shutter. If the image shutter is closed the light is absorbed.

The image shutters in the multi-wavelength shutter are arranged with respect to each other so that light that enters the multi-wavelength shutter is reflected from the front surface of each of the image shutters comprised in the multi-wavelength shutter before the light can exit the wavelength shutter. As a result, light in any particular wavelength band of the at least two wavelength bands of the multi-wavelength shutter is selectively shuttered or modulated by the multi-wavelength shutter by controlling the image shutter that has its front aperture coated with the reflecting coating that transmits light in that particular wavelength band.

According to yet another aspect of the present invention, an image shutter is combined with different optical components to provide hybrid optical components that have an independent self-shuttering or modulating function. A hybrid optical component in accordance with a preferred embodiment of the present invention is activated or transmits light at an operating wavelength of the shutter only when the image shutter is substantially open. In one such hybrid optical component a lens is provided with its own shutter by bonding the lens to an image shutter, in accordance with a preferred embodiment of the present invention, using processes known in the art. In another hybrid optical component an image shutter, in accordance with a preferred embodiment of the present invention, one of the end surfaces of the diode structure of the shutter is bonded using processes known in the art with a reflecting mirror. Preferably, the mirror is a metallic coating that acts as a reflector and electrode. In another hybrid component, in accordance with a preferred embodiment of the present invention, a light sensitive device such as a CMOS-CCD has an image shutter attached to its surface.

In still yet another aspect of the present invention, an image shutter is combined with a number of different optical components to form a modular optical device. In one modular optical device, in accordance with a preferred embodiment of the present invention, an image shutter is combined with a lens and an imaging device, preferably a CMOS-CCD. The CMOS-CCD is located at the image plane of the lens and an image shutter is located between the lens and the CMOS-CCD so that only when the image shutter is open is the CMOS-CCD activated by light at an operating wavelength of the image shutter.

There is therefore provided in accordance with a preferred embodiment of the present invention an optical image shutter for modulating light, having a shutter aperture defined by an aperture area on a plane, wherein the image shutter modulates light incident on the area of the aperture, comprising: a multiplicity of thin layers of alternating narrow and wide gap semiconductor material stacked to form an MQW structure; and electrodes located on at least two semiconductor surfaces of the image shutter, configured so that a voltage difference applied between them produces an electric field that is temporally and spatially substantially uniform in the volume of the MQW structure, wherein the aperture area is greater than 4 square mm. More preferably the aperture area is greater than 9 square mm. Most preferably, the aperture area is greater than 16 square mm.

Alternatively or additionally the electrodes preferably comprise a first electrode located on a first semiconductor surface and a second electrode located on a second semiconductor surface, wherein the first and second semiconductor surfaces are substantially parallel to the plane of the aperture area. Preferably, each of the first and second electrodes comprises a conducting layer in the shape of a closed border which surrounds the aperture area. Alternatively or additionally at least one of the first and second electrodes preferably comprises conducting elements which cover at least a portion of the aperture area.

There is further provided in accordance with a preferred embodiment of the present invention an optical image shutter for modulating light, having a shutter aperture defined by an aperture area on a plane, wherein the image shutter modulates light incident on the area of the aperture, comprising: electrodes located on at least two semiconductor surfaces of the image shutter; and a voltage source which selectively energizes the electrodes to produce relatively transmitting and relatively blocking optical states of the shutter, wherein at least one of the first and second electrodes comprises conducting elements which cover at least a portion of the aperture area.

In some preferred embodiments of the present invention conducting elements comprise a mesh of conductors that overlays at least part of the aperture area.

At least one of the electrodes in some preferred embodiments of the present invention, comprises a multiplicity of connections to at least one voltage source.

In some preferred embodiments of the present invention conducting elements are independently driven. Preferably, conducting elements are driven sequentially with selectable relative delays.

In some preferred embodiments of the present invention one of the first and second electrodes is a metal conductor that covers substantially all the aperture area and reflects light incident on the image shutter after the light has passed once through the material of the shutter.

In some preferred embodiments of the present invention at least one conducting element of the electrodes is connected to a source of power through at least one circuit element situated on the semiconductor surface on which the conducting element is located. Preferably, at least one of the at least one circuit element is a FET. Alternatively or additionally, at least one of the semiconductor surfaces on which circuit element is an emitter follower.

In some preferred embodiments of the present invention the at least one circuit element comprises a plurality of circuit elements each separately connected to the at least one conducting element. Preferably at least two of the plurality of circuit elements are connected to the same conducting element.

In some preferred embodiments of the present invention the at least one conducting element comprises a plurality of disconnected conducting elements and wherein at least one of the circuit elements is connected to each of the disconnected circuit elements.

At least one semiconductor surface on which the electrodes are located comprises a heavily p doped layer in some preferred embodiments of the present invention. Preferably, the p doped layer has a concentration of p impurity of at least $10^{19}$ impurities/cm$^3$. In some preferred embodiments of the present invention at least one semiconductor surface on which the electrodes are located comprises a heavily n doped layer. Preferably, the n doped layer has a concentration of n impurity of at least $10^{19}$ impurities/cm$^3$.

A transition between a transmitting state and a non-transmitting state is established in less than 10 nanoseconds in some preferred embodiments of the present invention. In other preferred embodiments of the present a transition between a transmitting state and a non-transmitting state is established in less than 5 nanoseconds. In still other preferred embodiments of the present invention a transition between a transmitting state and a non-transmitting state is established in less than 2 nanoseconds.

In some preferred embodiments of the present invention surfaces through which light enters or exits the image shutter are coated with anti-reflecting coating that reduces insertion and exit losses of the image shutter to less than 0.5%. In other preferred embodiments of the present invention surfaces through which light enters or exits the image shutter are coated with anti-reflecting coating that reduces insertion and exit losses of the image shutter to less than 0.1%.

In some preferred embodiments of the present invention electrodes are formed from transparent conducting material.

There is further provided in accordance with a preferred embodiment of the present invention an optical device comprising at least two image shutters, in accordance with preferred embodiments of the present invention, wherein the image shutters are aligned so that light entering one of the at least two image shutters is modulated by all of the at least two image shutters.

There is also provided, in accordance with a preferred embodiment of the present invention an optical device for forming light pulses of duration Δt comprising a first and second image shutter in accordance with preferred embodiments of the present invention wherein the first shutter is controlled to be non-transmitting and the second shutter is controlled to be transmitting and wherein light is incident on the first shutter, and wherein when the first shutter is controlled to be transmitting at time t, the second shutter is controlled to be non-transmitting at time t+Δt.

There is also provided, in accordance with a preferred embodiment of the present invention, an optical device for shuttering light having wavelengths in at least two different wavelength bands comprising at least one image shutter in accordance with a preferred embodiment of the present invention for each wavelength band, wherein the at least one image shutter for a wavelength band has a reflecting coating on a back surface that reflects wavelengths in the wavelength band and a reflecting coating on a front surface that transmits wavelengths in the wavelength band and reflects wavelengths in the other of the at least two wavelength bands, and wherein light in the wavelength band is incident on the front surface and, if the at least one image shutter is open, is reflected from the back surface.

There is farther provided, in accordance with a preferred embodiment of the present invention, an optical device comprising at least one image shutter in accordance with a preferred embodiment of the present invention, and an optical element combined in a single unit to form a hybrid optical component. One hybrid optical component, in accordance with a preferred embodiment of the present invention, comprises a lens attached to a shutter in accordance with a preferred embodiment of the present invention.

Another hybrid optical component, in accordance with a preferred embodiment of the present invention, comprises an image sensor attached to a shutter in accordance with a preferred embodiment of the present invention. Preferably, the image sensor is a CMOS-CCD.

Yet another hybrid optical component, in accordance with a preferred embodiment of the present invention, comprises a mirror attached to a shutter in accordance with a preferred embodiment of the present invention.

There is further provided an optical device, in accordance with a preferred embodiment of the present invention, comprising an image shutter in accordance with a preferred embodiment of the present invention, combined with a lens and an image sensor located at the focal plane of the lens to form a shuttered imaging device.

There is also provided, in accordance with a preferred embodiment of the present invention, an optical device comprising an image shutter in accordance with a preferred embodiment of the present invention combined with a lens, an image sensor located at the focal plane of the lens and light emitting elements wherein reflected light emitted by the light emitting elements is focused on the image sensor. Preferably, the light emitting elements are LEDs. Alternatively, the light emitting elements are preferably lasers. In some optical devices in accordance with a preferred embodiment of the present invention the light emitting elements are situated on a semiconductor surface of the image shutter.

BRIEF DESCRIPTION OF FIGURES

The invention will be more clearly understood by reference to the following description of preferred embodiments thereof in conjunction with the figures, wherein identical structures, elements or parts which appear in more than one figure are labeled with the same numeral in all the figures in which they appear, and in which:

FIG. 2 shows schematically an array of three image shutters used to form a compound image shutter, in accordance with a preferred embodiment of the present invention;

FIG. 3 shows schematically two image shutters aligned collinear, in accordance with a preferred embodiment of the present invention, to provide very short, fast rise time, light pulses;

DETAILED DESCRIPTION OF PREFERRED EMBODIMENTS

Figure 1:
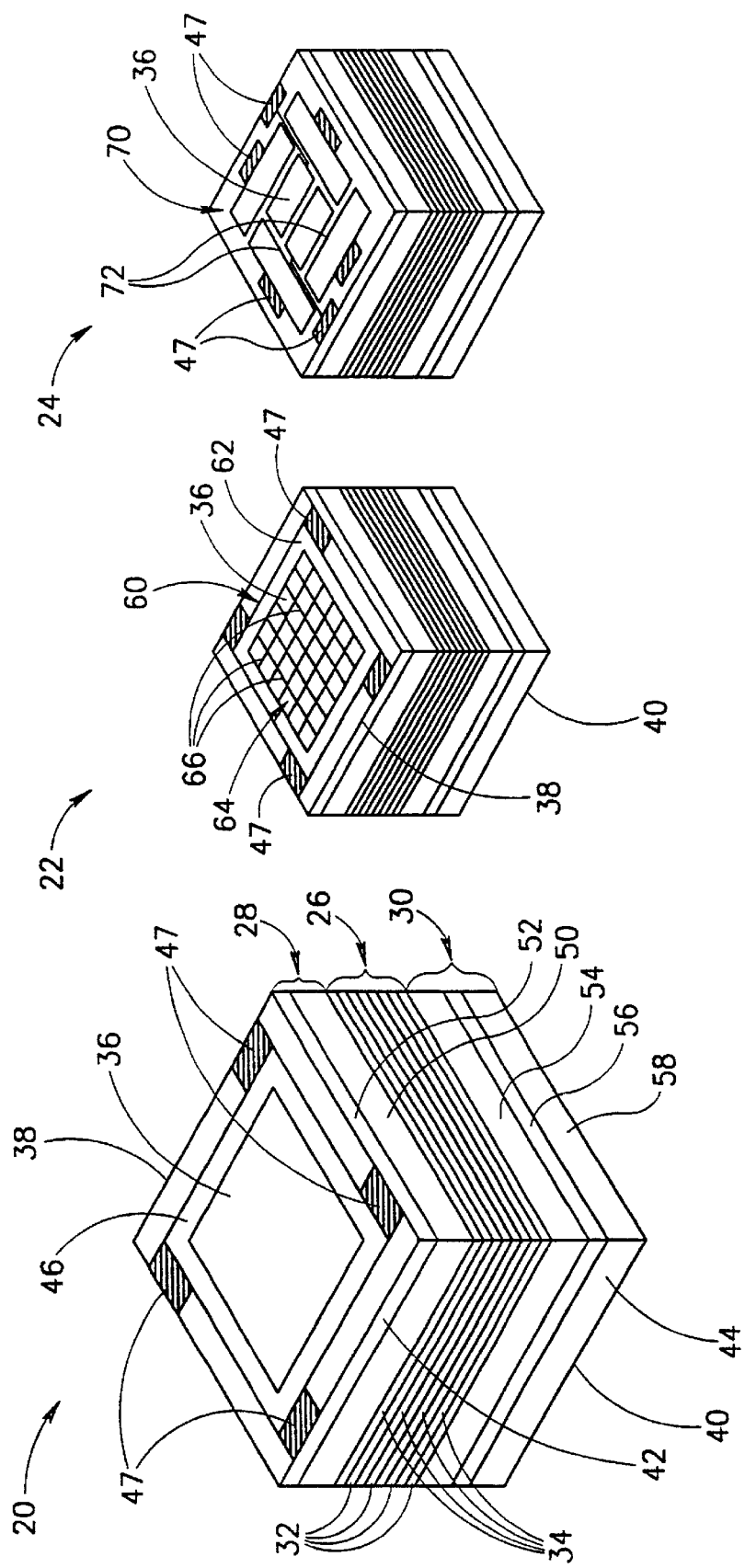
FIGS. 1A–1C show schematics of image shutters, in accordance with preferred embodiments of the present invention, with dimensions greatly exaggerated and not to scale for ease and clarity of presentation.

FIGS. 1A–1C show image shutters 20, 22 and 24, in accordance with preferred embodiments of the present invention. In these figures dimensions are greatly exaggerated and not to scale for ease and clarity of presentation.

Image shutter 20, shown in FIG. 1A, comprises an epitaxial MQW structure 26 between heavily p doped layers 28 and n doped layers 30 to form a pin diode structure. MQW structure 26 comprises a multiplicity of narrow gap semiconductor layers 32 alternating with wide gap semiconductor layers 34. Various compounds of III–V elements may be used to form layers 32 and 34 in MQW structure 26. Preferably, layers 32 are all of the same thickness. Preferably the thickness of layers 32 is substantially less than the diameter of excitons in layers 32. Preferably, wide gap layers 34 are thick enough so that wave functions of electrons and holes confined in one narrow gap layer (i.e. a quantum well) of MQW 26 are substantially uncoupled from wave functions of particles in adjacent layers of MQW 26. The energy of the absorption edge of the MQW structure 26 and thereby the operating wavelengths of image shutter 20, can be varied by changing which elements are used to form narrow gap layers 32, the mole fractions of the elements and the thickness of the layers.

Light enters image shutter 20 through a first aperture 36 on a first end surface 38 of image shutter 20, travels through image shutter 20 substantially perpendicular to the planes of layers 32 and 34 in MQW structure 26 and exits through a second aperture 36 (not shown), preferably identical to and parallel to first aperture 36, on a second end surface 40 of image shutter 20. First end surface 38 is preferably a surface area of a thick heavily p doped semiconductor layer 42. Second end surface 40 is preferably a surface area of a thick heavily n doped semiconductor layer 44. While image shutter 20 is shown having a square cross section and first aperture 36 is square, other convenient cross sections and aperture shapes are possible and advantageous.

First and second apertures 36 are preferably coated with an antireflective coating by processes known in the art so that light at an operating wavelength of image shutter 20 enters and exits image shutter 20 with very little insertion and exit loss. Preferably, the sum of insertion and exit loss is less than 5%. More preferably the sum is less than 1%. Most preferably the sum is less than 0.5%. Preferably the area of first and second apertures 36 is greater than 4 mm². More preferably the area of first and second apertures 36 is greater than 9 mm². Most preferably the area of first and second apertures 36 is greater than 16 mm².

Each of first and second apertures 36 is preferably surrounded by a driving electrode 46 configured in the shape of a "picture frame" (only driving electrode 46 surrounding first aperture 36 is shown). Driving electrodes 46 are bonded to end surfaces 38 and 40 by methods known in the art. Voltage differences applied between driving electrodes 46 at end surfaces 38 and 40 create an electric field in MQW structure 26 and cause image shutter 20 to attenuate light at operating wavelengths of image shutter 20. Voltage differences are preferably applied between driving electrodes 46 by using a multiport electrification scheme whereby each driving electrode 46 is simultaneously electrified at a plurality of points along edges of the driving electrode 46. This is preferably accomplished using FETs or emitter followers, 47 formed on the substrate immediately outside of electrode 46. The geometry of driving electrodes 46 and the multiport electrification scheme reduce the rise time of image shutter 20.

Preferably, narrow gap layers 32 are formed from GaAs and wide gap layers 34 are formed from $Al_xGa_{(1-x)}As$. Heavily p doped layers 28 preferably comprise layers 50 and 52 which are respectively 400 nm of $Al_xGa_{(1-x)}As(p^{++})$ and 20 nm of $GaAs(p^{++})$. Heavily n doped layers 30 preferably comprise layers 54, 56 and 58 which are respectively 300 nm of $Al_xGa_{(1-x)}As(n^{++})$, 20 nm of $GaAs(n^{++})$ and 100 nm of $Al_xGa_{(1-x)}As(n^{++})$. Preferably doping levels of layers 28 and 30 are greater than $10^{19}/cm^3$. For operating wavelengths near 860 nm preferably x ~0.36 and the thickness of narrow gap and wide gap layers are 10 nm and 8 nm respectively. The multiplicity of narrow gap layers 32 in MQW structure 20 is preferably greater than 100. The inventors have found that with 120 narrow gap layers 32 and antireflecting coatings that reduce insertion and exit loss to about 0.1%, image shutter 20 provides an on/off ratio of 20 for operating wavelengths near 860 nm. It should be realized that the values for the mole ratios, the thickness of the different layers and doping levels noted above are examples and that values for these parameters different from the values noted are possible and can be advantageous.

FIG. 1B shows a schematic of an image shutter 22, in accordance with a second preferred embodiment of the present invention. Image shutter 22 is similar to image shutter 20 except for driving electrodes 60 (only one of which is shown) on surfaces 38 and 40 which are in place of driving electrodes 46 of image shutter 20. Each driving electrode 60 comprises a conducting "picture frame" 62 and a mesh 64 of conducting wires 66. A driving electrode 60 is placed on each of apertures 36 (only one of which is shown) of image shutter 22 so that picture frame 62 surrounds the aperture 36 and conducting mesh 64 covers the surface of the aperture 36. The dimensions of the cross section of conducting wires 66 and the spacing between conducting wires 66 in mesh 64 are such that driving electrodes 60 do not contribute significantly to insertion and exit loss or cause unwanted diffraction effects in image shutter 22. Preferably, conducting wires 66 are formed from transparent conducting material. As in the case of driving electrodes 46, driving electrodes 62 are preferably electrified in a multiport electrification scheme using FETs or emitter followers 47 formed on the substrate immediately outside of electrode 62.

FIG. 1C shows a schematic of an image shutter 24 similar to image shutters 20 and 22 in which driving electrodes on apertures 36 are divided electrodes 70 (only one of which is shown). Each divided electrode 70 comprises a plurality of sector electrodes 72 wherein each sector electrode 72 covers a different region of the aperture 36 on which the divided electrode 70 is placed. Preferably, divided electrodes 70 on each of apertures 36 on opposite faces 38 and 40 are identical and oriented with respect to each other so that they are mirror images of each other. Image shutter 24 is operated by applying voltage differences between pairs of sector electrodes 72, where a pair of sector electrodes comprises a sector electrode 72 on one aperture 36 and its mirror image sector electrode 72 (not shown) on the opposite aperture 36. Pairs of sector electrodes 72 are preferably driven independently of each other with controllable small delay times between voltages applied to pairs of sector electrodes 72. The capacitance of a single sector electrode pair is approximately equal to the capacitance of image shutter 24 divided by the number of sector electrodes 72 in a divided electrode 70. The sector electrode pairs essentially divide up the capacitance of image shutter 24 between them. Image shutter 24 can therefore be operated with a much faster rise time by driving individual sector electrodes 72 through independent power sources (not shown) than by driving image shutter 24 with two single large electrodes one on each of end surfaces 36. Furthermore, by introducing small time delays between the voltages applied to sector electrode pairs, the irising problem common to large aperture shutters, whereby a signal applied to the shutter requires a finite, non-negligible time to propagate to the center of the shutter can be ameliorated. Electrifying sector electrode pairs closer to the centers of apertures 36 slightly earlier than sector electrode pairs closer to edges of apertures 36 does this.

Divided electrodes 70 comprise at least two sector electrodes 72. Divided electrode 72 in FIG. 1C is shown having six sector electrodes 72. Each sector electrode 72 is preferably a small planar conductor formed from a transparent conducting material. Alternatively, each sector electrode 72 comprises a small conducting wire or loop. Preferably the conducting wire or loop is formed from a transparent conducting material. Each sector electrode 72 is preferably driven by its own FET or emitter follower 47 formed on the same semiconductor layers to which divided electrodes 70 are bonded. It should be understood that geometries other than that shown in FIG. 1C for the shape and dispostion of sector electrodes 72 are possible and advantageous. For example, sector electrodes 72 can be crescent shaped and arranged in concentric circles.

A multiplicity of image shutters, in accordance with a preferred embodiment of the present invention, can be aligned collinear alone a common axis perpendicular to the surfaces of their apertures to form a compound shutter. In such a compound shutter, light entering an aperture of a first of the aligned image shutters passes through all the image shutters. A compound shutter in accordance with a preferred embodiment of the present invention can be used to provide image shutters that operate at very high on/off transmission ratios and low voltages. For example if a compound shutter in accordance with a preferred embodiment of the present invention comprises a multiplicity of N shutters, wherein each shutter of the multiplicity of shutters provides an on/off transmission ratio of CR for a voltage change of V, the compound shutter provides an on/off transmission ratio of $CR^N$ for the same voltage change V.

FIG. 2 shows schematically an example where a multiplicity of three image shutters 20 as shown in FIG. 1A, having an on/off transmission ratio of 7, are bonded together to form a compound image shutter 100. Compound image shutter 100 provides an on/off transmission ratio of $7^3=343$ and operates with the same voltage range as one of image shutters 20. When a voltage is applied to each of image shutters 20 that closes them, i.e. causes them to attenuate light at an operational wavelength to a maximum, light, shown schematically by arrows 102 is attenuated by a factor of 7 each time it passes through one of image shutters 20. Driving electrodes 46, which are adjacent to each other in compound image shutter 100, are preferably driven at the same voltage. It should be realized that image shutters other than image shutter 20, in accordance with different preferred embodiments of the present invention, such as image shutters 22 and 24 in FIGS. 1B and 1C, respectively, can be used to form compound image shutters. The use of image shutter 20 to form compound image shutter 100 in FIG. 2 is by way of example.

Compound image shutters, in accordance with a preferred embodiment of the present invention, can also be used to modulate light by transmitting light at intensities which are predetermined fractions of intensities of incident light having a wavelength equal to an operational wavelength of the compound image shutter. For example if each of image shutters 20 comprised in compound shutter 100 has an on/off transmission ratio of 2, compound shutter 100 can be used to transmit light at intensities of ~1, ½, ¼ and ⅛ times the intensity of light incident on compound shutter 100.

FIG. 3 shows two image shutters 160 and 162 of the types shown in FIGS. 1A–1C colinearly aligned along an axis 163 perpendicular to their apertures 36, in accordance with a preferred embodiment of the present invention, to provide very short, fast rise time, light pulses. Curve 164 represents the "open/close" status of shutter 160. Raised part 166 of curve 164 indicates when shutter 160 is open and lowered part 168 of curve 164 indicates when shutter 160 is closed. At a time t1 shutter 160 switches from closed to open. Similarly, curve 170 represents the open/close status of shutter 162. Raised and lowered parts 172 and 174 respectively of curve 170 indicate when shutter 162 is open and closed. At time t2 shutter 162 switches from being open to being closed. Light can pass through both shutters 160 and 162 from one side of shutters 160 and 162 to the other side of shutters 160 and 162 only when both are simultaneously open. This occurs from time t1 to time t2. Curve 176 represents the open/close status of shutters 160 and 162 acting together. Raised part 178 of curve 176 represents the time period t1–t2 during which shutters 160 and 162 simultaneously transmit light. Light, indicated by wavy arrow 180 which is incident on shutter 160 in the direction of shutter 162 will be transmitted during the time both shutters are open to form a pulse of light (t2–t1) seconds long. Since the absorption edge of the multiple quantum well structure of shutters 160 and 162 is very steep, shutters 160 and 162 switch from a state of transmission to a state of no transmission during a very short period of time during the rise time of the electric field applied to shutters 160 or 162. The switching time can therefore be made shorter than the electrical rise time of shutters 160 and 162. As a result by operating shutters 160 and 162, in accordance with a preferred embodiment of the present invention, as shown by way of example in FIG. 3, very short well defined pulses of light can be produced.

A multiplicity of image shutters, in accordance with a preferred embodiment of the present invention, can be used to provide a multi-wavelength shutter that modulates light in a plurality of different wavelength bands. Each of the multiplicity of image shutters has one aperture, a front aperture, covered with a selective reflecting coating that transmits light having a wavelength in a different one of the plurality of wavelength bands that the multi-wavelength shutter modulates. The other aperture, a back aperture, of each image shutter, is covered with a reflecting coating that reflects light having a wavelength in the wavelength band that the reflecting coating on the front aperture of the image shutter transmits.

Light incident on a particular image shutter that is in the wavelength band transmitted by the reflecting coating on the front aperture of the image shutter, is reflected from the image shutter by the reflecting coating on the back aperture of the image shutter when the image shutter is open. If the image shutter is closed, the shutter absorbs the light. The image shutter always reflects light in any of the other wavelength bands of the multi-wavelength shutter.

The multiplicity of image shutters in the multi-wavelength shutter are arranged with respect to each other so that light that is incident on the multi-wavelength shutter is reflected from the front aperture of each of the multiplicity of image shutters before the light can exit the multi-wavelength shutter. As a result, light in any particular wavelength band of the multiwavelength shutter is selectively shuttered or modulated by the multi-wavelength shutter by controlling the image shutter that has its front aperture coated with the reflecting coating that transmits light in that particular wavelength band. The number of different wavelength bands modulated by the multi-wavelength shutter is equal to or less than the number of the image shutters comprised in the wavelength shutter.

Figure 4:
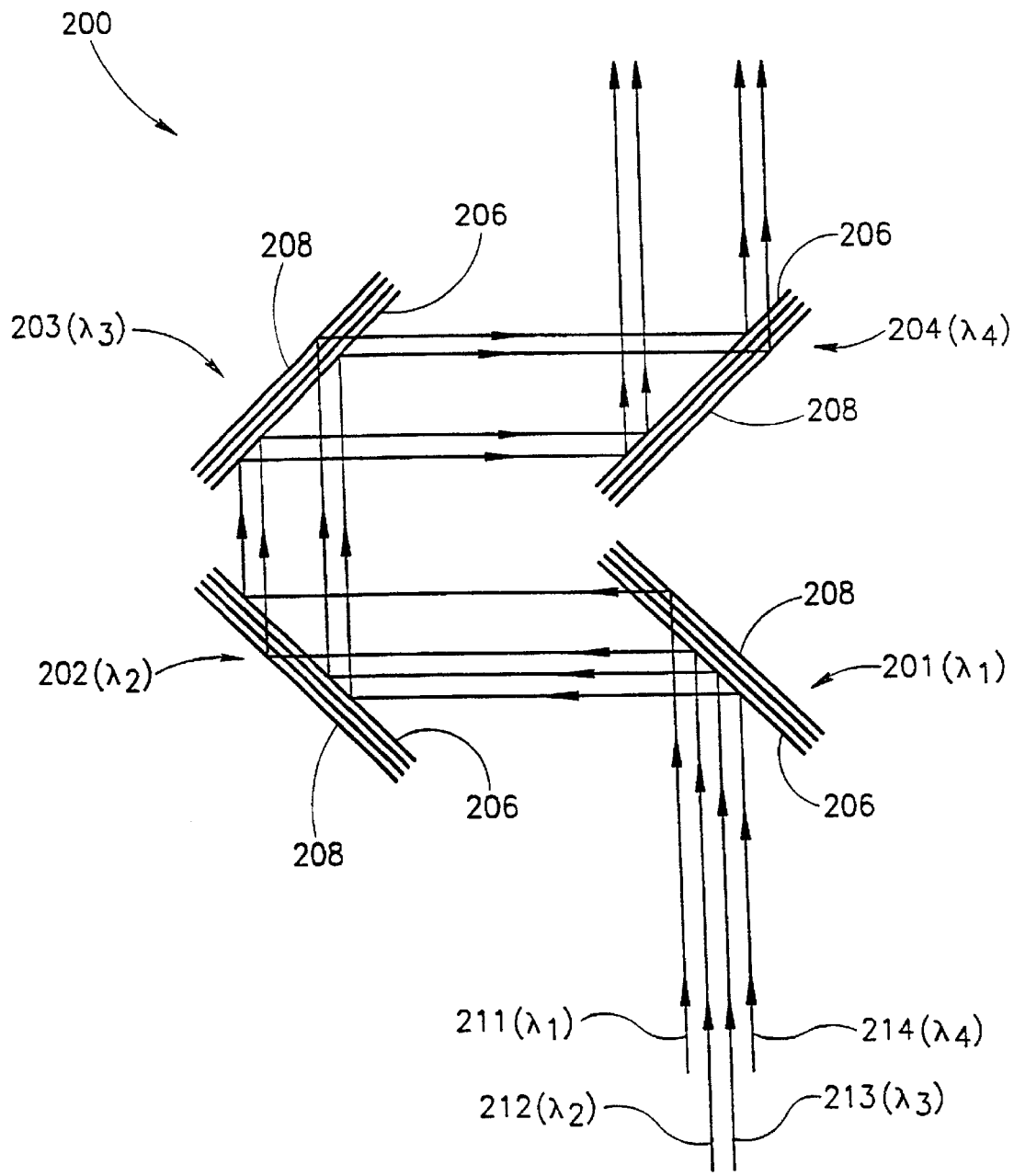
FIG. 4 shows a schematic of a multiple wavelength image shutter for modulating light in four different wavelength bands, in accordance with a preferred embodiment of the present invention.

FIG. 4 shows a schematic of a multi-wavelength shutter 200, in accordance with a preferred embodiment of the present invention, for modulating four different wavelength bands of light, referred to as wavelength bands λ1, λ2, λ3 and λ4 respectively. Multi-wavelength shutter 200 comprises four different image shutters 201, 202, 203 and 204. Each image shutter 201, 202, 203 and 204 has a front aperture 206 and a back aperture 208. Front apertures 206 and back apertures 208 of image shutters 201, 202, 203 and 204 are covered with reflecting coatings (not shown). The reflecting coatings on front apertures 206 of image shutters 201, 202, 203 and 204 transmit light in wavelength bands λ1, λ2, λ3 and λ4 respectively (shown FIG. 4 in parenthesis beside numerals 201, 202, 203 and 204 respectively) and reflect light in any of the other wavelength bands. The reflecting coatings on back apertures 208 of image shutters 201, 202, 203 and 204 reflect light in wavelength bands λ1, λ2, λ3 and λ4 respectively. Image shutters 201, 202, 203 and 204 are oriented with respect to each other so that light incident on front aperture 206 of image shutter 201 must reflect from front surfaces 206 of image shutters 202, 203 and 204 also in order to be transmitted through multi-wavelength shutter 200.

Shown in FIG. 4 are four light rays 211, 212, 213 and 214 that are incident on front surface 206 of image shutter 201. Light rays 211, 212, 213 and 214 have wavelengths in wavelength bands λ1, λ2, λ3 and λ4 respectively (shown FIG. 4 in parenthesis beside numerals 211, 212, 213 and 214 respectively). Each of image shutters 201, 202, 203 and 204 is open and each of light rays 211, 212, 213 and 214 is transmitted through multi-wavelength shutter 200. Light rays 211, 212, 213 and 214 are reflected from back apertures 208 of image shutters 201, 202, 203 and 204 respectively. If image shutter 201, 202, 203 or 204 is closed then light ray 211, 212, 213 or 214 respectively will stop being transmitted.

Figure 5A:
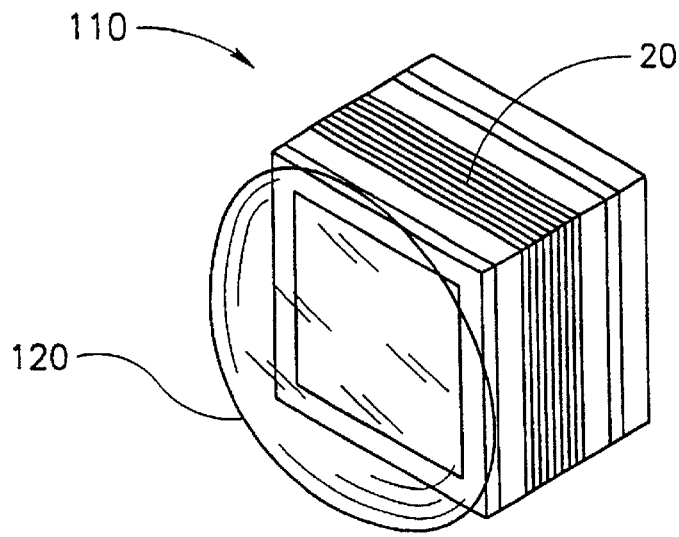
FIGS. 5A–5C show schematically hybrid optical components in accordance with preferred embodiments of the present invention.
Figure 5B:
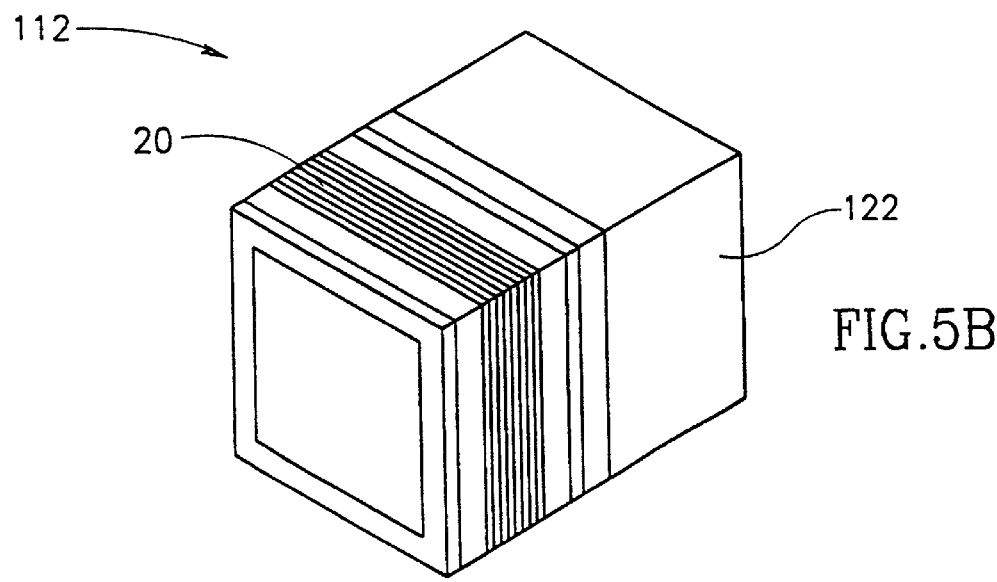
Figure 5C:
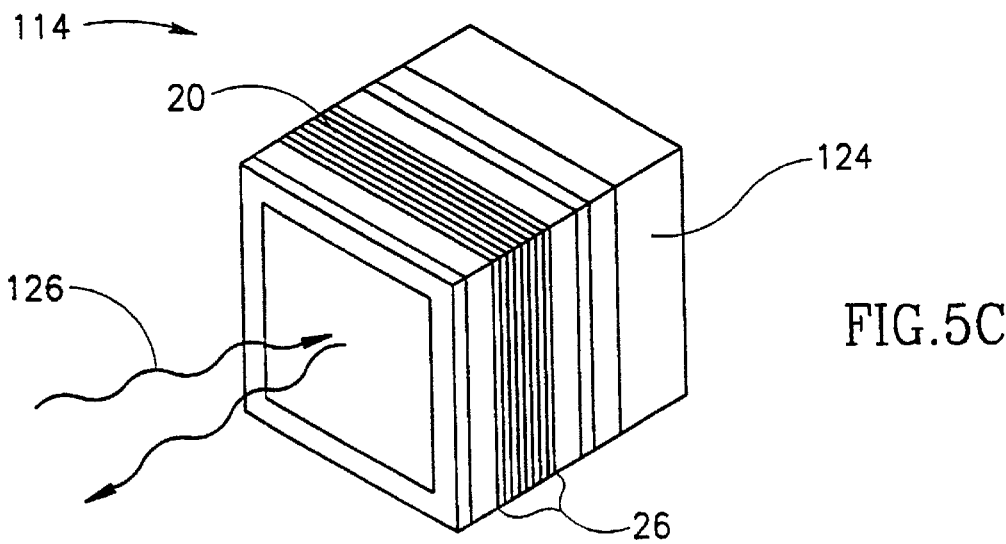

FIGS. 5A–5C show hybrid optical components 110, 112 and 114 in accordance with preferred embodiments of the present invention. FIG. 5A shows hybrid optical component 110 comprising an image shutter 20, in accordance with a preferred embodiment of the present invention, bonded to a lens 120. FIG. 5B shows hybrid optical component 112 comprising an image shutter 20, in accordance with a preferred embodiment of the present invention, bonded to a light sensitive device 122 such as a CMOS-CCD. FIG. 5C shows hybrid component 114, which comprises an image shutter 20 bonded to a mirror 124, in accordance with a preferred embodiment of the present invention. Light, shown schematically by arrows 126 enters hybrid component 114 and is reflected by mirror 124. Light passes through MQW structure 26 of image shutter 20 twice before exiting hybrid component 114, once on the way to mirror 124 and once on the way from mirror 124. Therefore, the on/off transmission ratio achieved by hybrid component 114 is the square of the on/off transmission ratio available from transmission components in which light passes through MQW structure 26 once.

Figure 6A:
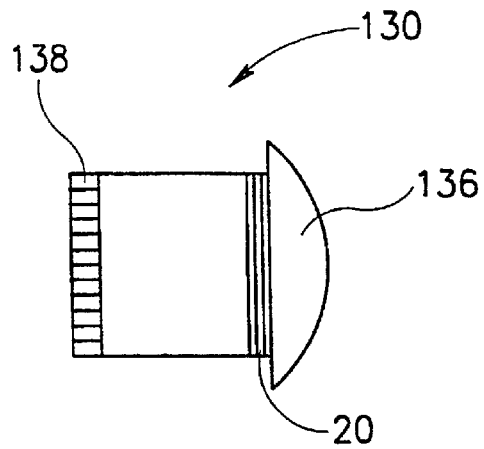
FIGS. 6A–6C show schematically modular optical devices in accordance with a preferred embodiment of the present invention.
Figure 6B:
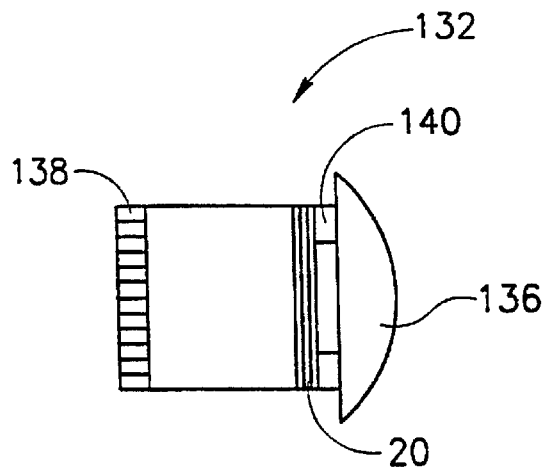
Figure 6C:
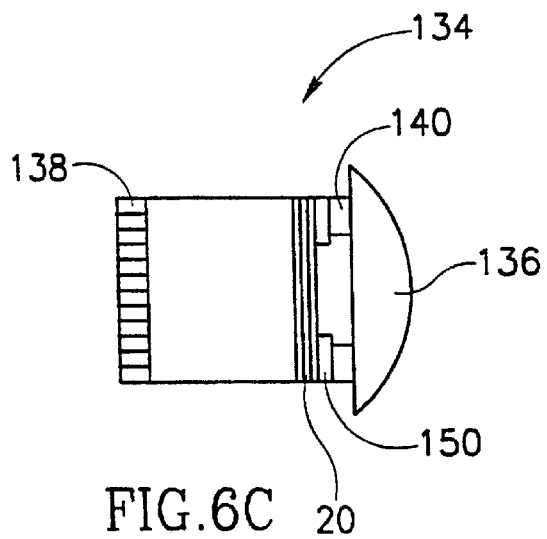

FIGS. 6A–6C show modular optical devices in accordance with preferred embodiments of the present invention. FIG. 6A shows a device 130 which comprises an image shutter 20 combined with a lens 136 and an image sensing device 138 such as a CMOS-CCD located at the focal plane of lens 136, in accordance with a preferred embodiment of the present invention. FIG. 6B shows a device 132 which comprises an image shutter 20 having light sources 140 such as LEDs or lasers grown on one of the outermost semiconductor layers of image shutter 20 combined with a lens 136 and an image sensing device 138, in accordance with a preferred embodiment of the present invention. FIG. 6C shows a device 134 comprising an image shutter 20 grown together as a single unit with light sources 140 and FETs 150 for controlling both light sources and image shutter switches in accordance with a preferred embodiment of the present invention. Image shutter 20 is combined with lens 136 and image sensing device 138 to form a complete modular device. Device 134 can be used as an optical range camera similar to the optical range camera described in PCT patent application PCT/IL96/00020.

The present invention has been described using a non-limiting detailed description of a preferred embodiment thereof. Variations of the embodiment described will occur to persons of the art. The detailed description is provided by way of example and is not meant to limit the scope of the invention, which is limited only by the following claims.

What is claimed is:

1. An optical image shutter for modulating light, having a shutter aperture defined by an aperture area on a plane, wherein said image shutter modulates light incident on said aperture area, comprising:
   a multiplicity of thin layers of alternating narrow and wide gap semiconductor material stacked to form an MQW structure; and
   electrodes located on at least two semiconductor planar end surfaces of the image shutter, and associated driving circuitry configured so that a voltage difference applied between said electrodes produces an electric field that is temporally and spatially substantially uniform in the volume of the MQW structure,
   wherein said aperture area is greater than 4 square mm.

2. An image shutter in accordance with claim 1 wherein said aperture area is greater than 9 square mm.

3. An image shutter in accordance with claim 1 wherein said aperture area is greater than 16 square mm.

4. An image shutter according to claim 1 wherein said electrodes comprise at least one first electrode located on a first semiconductor surface and at least one second electrode located on a second semiconductor surface, wherein said first and second semiconductor surfaces are substantially parallel to the plane of said aperture area.

5. An image shutter according to claim 4 wherein at least one of said at least one first and at least one second electrodes comprises a conducting layer in the shape of a closed border which surrounds said aperture area.

6. An image shutter according to claim 4 wherein at least one of said at least one first and at least one second electrodes comprises conducting elements which cover at least a portion of said aperture area.

7. An image shutter according to claim 6 wherein said conducting elements comprise a mesh of conductors that overlays at least part of said aperture area.

8. An image shutter according to claim 6 wherein said conducting elements are independently driven.

9. An image shutter according to claim 8 wherein voltages are applied to said conducting elements at times that are synchronized so that substantially equal voltages are established on the conducting elements substantially simultaneously.

10. An image shutter according to claim 6 wherein one of said at least one first electrode and at least one second electrode is a metal conductor that covers substantially all the aperture area and reflects light incident on said image shutter after the light has passed once through the material of the shutter.

11. An image shutter according to claim 1 wherein at least one of said electrodes comprises a multiplicity of connections to at least one voltage source.

12. An image shutter according to claim 1 wherein at least one conducting element of said electrodes is connected to a source of power through at least one circuit element situated on the semiconductor surface on which the conducting element is located.

13. An image shutter according to claim 12 wherein at least one of said at least one circuit element is a FET.

14. An image shutter according to claim 12 wherein at least one of said at least one circuit element is an emitter follower.

15. An image shutter according to claim 12 wherein said at least one circuit element comprises a plurality of circuit elements each separately connected to said at least one conducting element.

16. An image shutter according to claim 15 wherein at least two of said plurality of circuit elements are connected to the same conducting element.

17. An image shutter according claim 1 wherein at least one semiconductor surface on which said electrodes are located comprises a p doped layer having a concentration of p impurity of at least $10^{19}$ impurities/cm$^3$.

18. An image shutter according to claim 1 wherein at least one semiconductor surface on which said electrodes are located comprises an n doped layer having a concentration of n impurity of at least $10^{19}$ impurities/cm$^3$.

19. An image shutter according to claim 1 wherein surfaces through which light enters or exits said image shutter are coated with anti-reflecting coating that reduces insertion and exit losses of said image shutter to less than 0.5%.

20. An image shutter according to claim 1 wherein surfaces through which light enters or exits said image shutter are coated with anti-reflecting coating that reduces insertion and exit losses of said image shutter to less than 0.1%.

21. An image shutter according to claim 1 wherein electrodes are formed from transparent conducting material.

22. An optical device comprising at least two image shutters according to claim 1 wherein said image shutters are aligned so that light entering one of said at least two image shutters is modulated by all of said at least two image shutters.

23. An optical device for forming light pulses of duration $\Delta t$ comprising a first and a second image shutter according to claim 1, wherein said first shutter is controlled to switch from being closed to being open at a first time while said second shutter is open and said second shutter is controlled to be closed at a second time following a time delay $\Delta t$ from said first time.

24. An optical device for shuttering light having wavelengths in at least two different wavelength bands comprising at least one image shutter according to claim 1 for each wavelength band, wherein a shutter for a particular wavelength band of the at least two wavelength bands has a coating on a front surface that transmits light in the particular wavelength band and reflects light in the other of the at least two wavelength bands and a coating on a back surface that reflects light in the particular wavelength band and wherein when the shutter is open the optical device transmits light in the particular wavelength band.

25. An optical device comprising at least one image shutter according to claim 1 and an optical element combined together in a single unit.

26. An optical device according to claim 25 wherein said optical element comprises a lens.

27. An optical device according to claim 26 wherein said optical element comprises a mirror.

28. An optical device according to claim 25 wherein said optical element comprises an image sensor.

29. An optical device according to claim 28 wherein said image sensor is a CCD.

30. An optical device comprising an image shutter in accordance with claim 1 combined with a lens and an image sensor located at the focal plane of said lens to form a shuttered imaging device.

31. An optical device comprising an image shutter in accordance with claim 1 combined with a lens, an image sensor located at the focal plane of said lens and light emitting elements wherein light emitted by said light emitting elements is transmitted through the lens to illuminate a scene and light from the light emitting elements that is reflected from the scene is shuttered by said shutter and focused by said lens onto said image sensor.

32. An optical device according to claim 31 wherein said light emitting elements are LEDs.

33. An optical device according to claim 31 wherein said light emitting elements are lasers.

34. An optical device according to claim 31 wherein said light emitting elements are situated on a semiconductor surface of said image shutter.

* * * * *